United States Patent
Sanderson

(10) Patent No.: US 10,187,466 B2
(45) Date of Patent: *Jan. 22, 2019

(54) EFFICIENT LIVE-MIGRATION OF REMOTELY ACCESSED DATA

(71) Applicant: Google LLC, Mountain View, CA (US)

(72) Inventor: Tyler Sanderson, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,844

(22) Filed: Feb. 22, 2018

(65) Prior Publication Data
US 2018/0183869 A1 Jun. 28, 2018

Related U.S. Application Data

(63) Continuation of application No. 15/071,852, filed on Mar. 16, 2016, now Pat. No. 9,936,019.

(51) Int. Cl.
| | | |
|---|---|---|
| *G06F 15/167* | (2006.01) | |
| *H04L 29/08* | (2006.01) | |
| *G06F 3/06* | (2006.01) | |
| *G06F 9/455* | (2018.01) | |
| *G06F 9/50* | (2006.01) | |

(52) U.S. Cl.
CPC ........ *H04L 67/1095* (2013.01); *G06F 3/0604* (2013.01); *G06F 3/0647* (2013.01); *G06F 3/0664* (2013.01); *G06F 3/0683* (2013.01); *G06F 9/45558* (2013.01); *G06F 9/5088* (2013.01); *H04L 67/1097* (2013.01); *G06F 2009/4557* (2013.01); *G06F 2009/45583* (2013.01); *G06F 2009/45595* (2013.01)

(58) Field of Classification Search
CPC ............ H04L 67/1095; H04L 67/1097; G06F 3/0604; G06F 3/0647; G06F 3/0683
USPC ......................... 709/201–203, 208, 213–216
See application file for complete search history.

(56) References Cited

U.S. PATENT DOCUMENTS

| | | |
|---|---|---|
| 8,005,788 B2 | 8/2011 | Leroux |
| 8,386,731 B2 | 2/2013 | Mashtizadeh et al. |
| 8,429,647 B2 | 4/2013 | Zhou et al. |

(Continued)

OTHER PUBLICATIONS

"Replication (computing)," Wikipedia, the free encyclopedia, last modified on Jan. 13, 2016 [retrieved on Mar. 15, 2016]. Retrieved from the Internet: URL<https://en.wikipedia.org/wiki/Replication_%28computing%29#Disk_storage_replication>, 8 pages.

(Continued)

*Primary Examiner* — Bharat Barot
(74) *Attorney, Agent, or Firm* — Fish & Richardson P.C.

(57) ABSTRACT

Methods, systems, and apparatus, including computer programs encoded on a computer storage medium, for migrating data from a first storage system to a second storage system. That data is for a process (e.g., a virtual machine, application, or some other process) operating on a computer system that is separate from the first storage system and the second storage system. That data is stored according to data subsets that are each exclusive of each other. As each data set is migrated, access to the data set by the process is precluded, but access for the remaining data sets is not affected. Once the data migration is complete, access to the data set by the process is restored.

16 Claims, 4 Drawing Sheets

(56) References Cited

U.S. PATENT DOCUMENTS

| | | |
|---|---|---|
| 8,769,241 B2 | 7/2014 | Chiang |
| 9,003,159 B2 | 4/2015 | Deshkar |
| 9,164,895 B2 | 10/2015 | Chiang |
| 9,229,878 B2 | 1/2016 | Hod |
| 9,465,561 B2 | 10/2016 | Nishina |
| 9,483,298 B2 | 11/2016 | Sarkar |
| 9,936,019 B2 * | 4/2018 | Sanderson .......... H04L 67/1095 |
| 2010/0071025 A1 | 3/2010 | Devine et al. |
| 2012/0192181 A1 | 7/2012 | Gilbert et al. |
| 2013/0138764 A1 | 5/2013 | Satapathy |
| 2014/0173598 A1 | 6/2014 | Haikney et al. |
| 2014/0196037 A1 | 7/2014 | Gopalan |
| 2014/0208315 A1 | 7/2014 | Abali et al. |
| 2014/0365738 A1 | 12/2014 | Hod et al. |
| 2015/0261576 A1 | 9/2015 | Gong |
| 2015/0381723 A1 * | 12/2015 | Sancheti ............... G06F 3/0683 709/217 |
| 2016/0308722 A1 * | 10/2016 | Kumarasamy ........ G06F 9/4856 |

OTHER PUBLICATIONS

Clark et al., "Live Migration of Virtual Machines," NSDI'05: $2^{nd}$ Symposium on Networked Systems Design & Implementation, pp. 273-286, 2005.

Hines et al., "Post-Copy Live Migration of Virtual Machines," ACM SIGPLAN/SIGOPS International Conference on Virtual Execution Environments (VEE), Mar. 2009, pp. 14-26.

International Search Report and Written Opinion in International Application No. PCT/US2016/064738, dated Mar. 20, 2017, 16 pages.

* cited by examiner

EFFICIENT LIVE-MIGRATION OF REMOTELY ACCESSED DATA

CROSS-REFERENCE TO RELATED APPLICATIONS

This application is a continuation application of, and claims priority to, U.S. patent application Ser. No. 15/071,852, titled "EFFICIENT LIVE-MIGRATION OF REMOTELY ACCESSED DATA," filed on Mar. 16, 2016. The disclosure of the foregoing application is incorporated herein by reference in its entirety for all purposes.

BACKGROUND

Cloud computing refers to network-based computing in which collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs).

Often times the data for a particular virtual machine is stored on one or more physical machines that are separate from the physical machine on which the virtual machine is instantiated. For a variety of reasons—load sharing, server maintenance, etc.—some or all of the data stored on a particular physical machine may be migrated to another physical machine. Live-migration of data is the process of moving data off of one physical machine to another physical machine while the virtual machine (or alternatively, a non-virtual processing entity) performs arbitrary reads and writes on the data.

SUMMARY

This specification relates to live migration of data.

This document describes a systematic method and system for moving data off of a storage computer to another storage computer while providing consistent and high performance access to the data to a third-party processing device (e.g., a virtual machine or an application) that is accessing the data remotely from another physical machine.

In general, one innovative aspect of the subject matter described in this specification can be embodied in methods that include the actions of storing, in a first physical machine, data for a data processing process running on a second physical machine that is separate from the first physical machine, the storing data comprising storing the data according to a plurality of data subsets that are each exclusive of each other; for each data subset, logically mapping in a mapping, by the data processing process, an address range for the data subset on the first physical machine to a respective logical address range for the data processing process; enabling read and write access to the data by the data processing process according to the logical addressing; determining that a first data subset stored on the first physical machine is to be migrated to a third physical machine separate from the first physical machine and the second physical machine, and in response: blocking read and write access by the data processing process to the first data subset while maintaining read and write access by the data processing process to the other data subsets, migrating, from the first physical machine to the third physical machine, the first data subset to store the data subset on the third physical machine, and updating the mapping by logically mapping, by the data processing process, an address range for the first data subset on the third physical machine to the respective logical address range for the data processing process. Other embodiments of this aspect include corresponding systems, apparatus, and computer programs, configured to perform the actions of the methods, encoded on computer storage devices.

In general, another aspect of the subject matter described in this specification can be embodied in a system that includes a first physical machine storing data according to a plurality of data subsets that are each exclusive of each other; a second physical machine that is separate from the first physical machine and a virtual machine on the second physical machine having read and write access to the data stored on the first physical machine and that, for each data subset, logically maps, in a mapping, an address range for the data subset on the first physical machine to a respective logical address range for the virtual machine; wherein in response to a determination that a first data subset stored on the first physical machine is to be migrated to a third physical machine separate from the first physical machine and the second physical machine: the first data subset is migrated from the first physical machine to the third physical machine; read and write access to the first data subset for the virtual machine is blocked during the migration while read and write access by the virtual machine to the other data subsets is maintained; and the mapping is updated by the virtual machine to logically map an address range for the first data subset on the third physical machine to the respective logical address range for the virtual machine; and read and write access to the first data subset for the virtual machine is restored after the migration of the first data subset from the first physical machine to the third physical machine. Other embodiments of this aspect include corresponding methods, apparatus, and computer programs, configured to perform the actions of the methods, encoded on computer storage devices.

Particular embodiments of the subject matter described in this specification can be implemented so as to realize one or more of the following advantages. The method provides better performance guarantees to the virtual machine than the other methods of live-migration such as pre-copy and post-copy live migration. For example, pre-copy live-migration considers the whole data address space as a whole migrating unit, and thus the entire address space exists completely on the originating side or completely on the destination side of the migration. To provide "live" access to the data while the migration is ongoing, the virtual machine is allowed to continue reading/writing the data, but writes are tracked so that changes can be resent to the receiving physical machine(s) of the live migration. This resending takes more read bandwidth, network bandwidth, CPU processing, and time. Furthermore, a busy virtual machine will typically be changing the data faster than the changes can be sent over the network to the destination; in such situations, the virtual machines access rate must be slowed, resulting in performance degradation.

With post-copy live-migration, the virtual machine is informed of the destination physical machine and requests the destination physical machine for the data. The destination physical machine provides the data if the data is stored on the destination physical machine; otherwise the destination physical machine fetches the data from the originating physical machine which the data is being migrated and then provides the data. When the data must be fetched from the originating physical machine the virtual machine experiences an increased latency. With many accesses from the destination physical machine to the originating physical machine, there is a significant overall bandwidth performance degradation.

The methods and systems described below, however, overcome some or all of these operational characteristics, resulting in an improvement in the technology area of data storage and management. By processing the migrating data in data subsets, which may be a chunk of X MB of data, or a page of data, etc., the migration is much more granular than pre-copy live-migration. The data subset undergoing migration is precluded from being accessed by the virtual machine. Thus, tracking of writes need not be performed. Once a data subset is migrated, it does not need to be resent because all future accesses go directly to the destination side.

The virtual machine experiences virtually no impact to performance if it is not accessing the data subset being migrated. As the data subset size decreases, the amount of time the virtual machine must be blocked while waiting for the data subset to migrate decreases. Conversely, as the data subset size increases, the amount of metadata for storage mapping decreases. Thus, by selectively evaluating the trade-off of wait time v. mapping maintenance, a system administration may tailor data subset size for a particular application that results in an improved migration performance operation for the application.

While the migration techniques described below do utilize some bandwidth for overhead, the amount utilized is relatively small compared to the bandwidth utilized by pre-copy or post-copy migration. This is still yet another improvement to the technological field of data migration.

Because read and write access is blocked for the data subset undergoing migration, no overhead mechanism for tracking changes to the data subset is needed, nor is there a need to specifically order virtual machine accesses to the data subset for the purpose of migration. For example, if the data store is a disk and the virtual machine performs a write to a location while there is an outstanding read to the same location for the purpose of migration, then the result of the read access is undefined. The systems and methods herein preclude concurrent access to the same location by blocking the virtual machine from accessing the specific region being migrated.

The live migration described below may be stopped at any time without losing progress. This is in contrast to pre-copy live migration, which must completely start over if stopped, and also in contrast to post-copy live migration, which cannot be stopped after accesses for the virtual machine are switched to the destination side.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
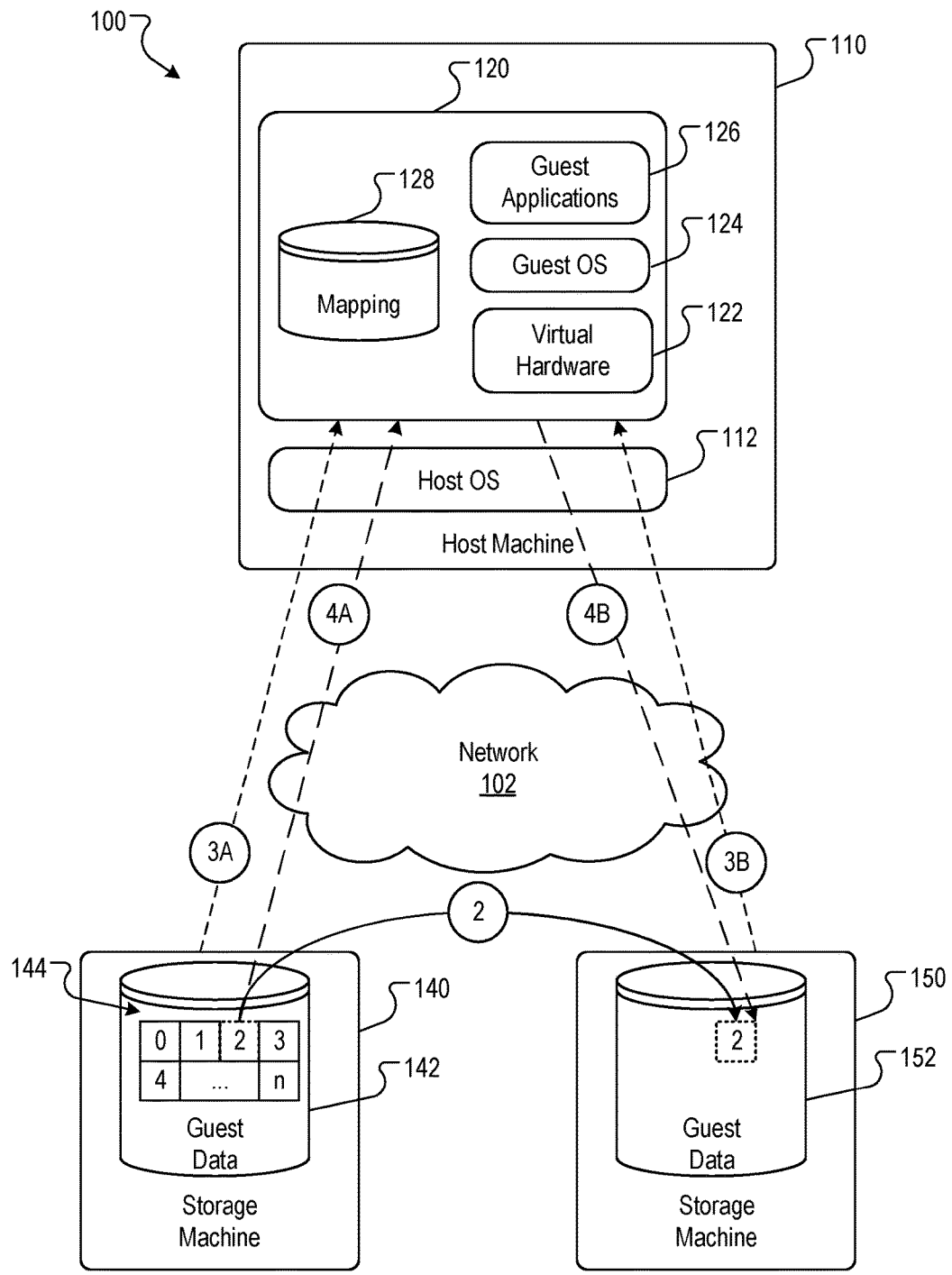
FIG. 1 is a block diagram of a cloud-based environment in which data may undergo live migration.

A first physical machine stores data according to multiple data subsets that are each exclusive of each other. The data is stored for a data processing process, such as a virtual machine, running on a second physical machine that is separate from the first physical machine. The data processing process has read and write access to the data stored on the first physical machine, and for each data subset logically maps, in a mapping, an address range for a data subset on the first physical machine to a respective logical address range for the data processing process.

When data from the first physical machine is to be migrated to the third physical machine, the following steps are taken. The data are migrated in data subsets. For each data subset undergoing migration (e.g., in the process of being "in flight" from the first physical machine to the third physical machine), read and write access by the data processing process to the data subset is blocked. However, read and write access by the data processing process to the other data subsets not undergoing data migration is maintained. In this way the data processing process may still access much of the data that is stored in the first physical machine. In response to a migration of a particular data subset from the first physical machine to the third physical machine, the mapping is updated by the data processing process. In particular, an address range for the particular data subset on the third physical machine is mapped to the respective logical address range for the data processing process, and the pre-migration mapping of the particular data subset is thus replaced by the updated mapping. Read and write access to the first data subset for the data processing process is restored after the migration of the first data subset from the first physical machine to the third physical machine. Thereafter, the data processing process accesses the third physical machine when data stored in the migrated data subset is needed by the data processing process.

Several variations to the above process may be advantageous, depending on system requirements. For example, a data processing process may not be notified of a migration of a data subset. Should the data processing process request access to data stored in the data subset from the first physical machine, it will then receive a response informing it that the data subset is now stored on a third physical machine (or currently undergoing migration to the third physical machine). If the data subset is currently undergoing migration, the third physical machine may block access to the data subset until the migration is complete.

Alternatively the data processing process may be proactively informed of the migration and may calculate an expected time of completion of the migration. The data processing process may then wait to request the data until the expected time of completion.

A data subset may be sent directly from the first physical machine to the third physical machine, and then one of the first or third physical machines will inform the data processing process of the new location of the data subset when the migration is complete. Alternatively, however, the data subset may be passed through the data processing process acting as an intermediary, and the data processing process is responsible for migration. This allows the data processing process to be up-to-date about where data resides in near real time.

In yet another implementation, the data processing process controls migration but the data subset is sent directly from one storage machine to the other. For example, the virtual machine sends a "transfer address range" message to first storage machine instructing the first storage machine to read a specific address range specified by the transfer address range and write that data to another address range a second storage machine. The storage machines are stateless, but by the instructions sent from the virtual machine, the data-subset is sent directly from the first storage machine to the second storage machine. This results in less data transfer than passing data through the VM, and is more scalable if many storage machines are involved.

Finally, the data subsets may be realized by a variety of different data management techniques. For example, a data subset may be a fixed size of memory unrelated to page or block size, e.g., 1 MB, 10 MB, or even 1 GB. Alternatively, data subsets may be realized at a block or page level, and a "watermark" is used such that all addresses below X are on the first physical machine, and all addresses at or above X are on the third physical machine. The value of X is updated in the data processing process as data are migrated. This can eliminate the data processing process mapping of logical address to data subset, and instead partitions the physical machines storing data according to the watermark value of X.

These features and other features are described in more detail below.

Example Operating Environment

FIG. 1 is a block diagram of a cloud-based environment 100 in which data may undergo live migration. In the written description below, an example implementation of a virtual machine is described. However, data migration of data for some of data processing process, such a client-based application have cloud-bases storage, or a cloud-based application having cloud based storage, may also be facilitated by the systems and methods described below.

A host machine 110, which is a physical machine, in the cloud-based environment 100, can contain one or more data processing apparatuses such as rack mounted servers or other computing devices. Storage machine 140 and 150, which are also physical machines, store data for a data processing process executing on the host machine 110. The storage machines 140 and 150 may also be one or more data processing apparatuses such as rack mounted servers or other computing devices, and typically are designed to facilitate storage of data for cloud-based access by the host machine 110 communicating through a network 102.

The host machine 110 executes a host operating system 112 that manages host machine resources. In this example, the host operating systems 112 run software that virtualizes the underlying host machine hardware and manages concurrent execution of one or more virtual machines 120. As illustrated in FIG. 1, the host operating system 112 manages one virtual machine 120. A host machine can, in general, manage larger quantities of virtual machines; however, the quantity may be limited based on physical resources of the host machine. For simplicity, only one virtual machine 120 is shown in FIG. 1.

The virtual machine 120 uses a simulated version of an underlying host machine hardware, which can be referred to as virtual hardware 122. Software that is executed by the virtual hardware 122 can be referred to as guest software, e.g., a guest operating system 124 and guest applications 126. In some implementations, guest software cannot determine if it is being executed by virtual hardware or by a physical host machine. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

The host machine 120 is allocated a set of virtual memory pages from the virtual memory of the underlying host operating system 112 and is allocated virtual disk blocks from one or more virtual disk drives for use by the guest software executing on the virtual machine. The actual physical storage need not be on the host machine 110, and in the example shown, the storage is realized by the storage machine 140.

In some implementations, virtual disk blocks are allocated on physical disk drives managed by the storage machine and communicating with the host machine 110 through the network 102. The virtual machine 120 can be allocated network addresses through which their respective processes can communicate with other processes via the network 102.

Assume that, initially, all the data for the virtual machine 120 is stored on the storage machine 140. This data for the virtual machine 120 is referred to as guest data 142. The guest data 142 need not initially be stored on a single physical machine, and can instead be initially stored across multiple storage machines. However, for simplicity of description, the starting point for this example is a single storage machine.

The guest data 142 is stored according to multiple data subsets that are each exclusive of each other. As shown in FIG. 1, the guest data 142 is stored in data subsets 144 and each data subset is illustratively indexed by one of the indices 0 . . . n. The mapping data 128 logically maps an address range for the data subset on the storage machine 140 to a respective logical address range for the virtual machine 120. Thus, by use of the mapping data 128, the virtual machine 120 can map a logical address space to a particular data subset stored on a particular physical machine. Finally, while the mapping data 128 is illustrated as being within the virtual machine 120, the mapping data 128 may also be maintained by the host operating system 112.

Events may occur that may cause some or all of the guest data 142 to be migrated to one or more other storage machines. Such events may include a storage machine 140 preparing to go offline for service, which requires migration of all the data stored at the storage machine; load balancing, which requires the migration of at least a portion of the data stored at the storage machine; or quality of service requirements not being met, which may require the migration of at least a portion of the data stored at the storage machine. As will be described below, in some situations the storage machine may determine when a migration is necessary, and in other situations the virtual machine (or host machine) may determine when a migration is necessary. In still other situations, a process or entity external to the virtual machine, host machine and storage machines can also determine when a migration is necessary, and either the virtual machine can control the migration or the storage machines can control the migration, as described in general above and as will be described in more detail below.

A generalized process for the live migration of data, which is indicated by the arrow with reference callout 2 in FIG. 1, is described with reference to FIG. 2. One example process in which the physical storage machines partially (or fully) control the migration is described with reference to FIG. 3, and is indicated by the arrow with reference callout 2 in combination with the arrows with reference callouts 3A and 3B in FIG. 1. Finally, an example process in which the virtual machine (or host machine) partially (or fully) controls the migration is described with reference to FIG. 4, and is indicated by the arrow with reference callout 2 in combination with the arrows with reference callouts 4A and 4B in FIG. 1.

For simplicity, the migration example described below will detail the migrating of data to one other physical machine—storage machine 150. However, should the guest data be stored on multiple storage machines, the guest data may be migrated from one of the storage machines to another storage machine that currently is storing some of the guest data, or a new storage machine that is not currently storing the guest data for the virtual machine 120.

Live Migration from First Physical Machine to Second Physical Machine

Figure 2:
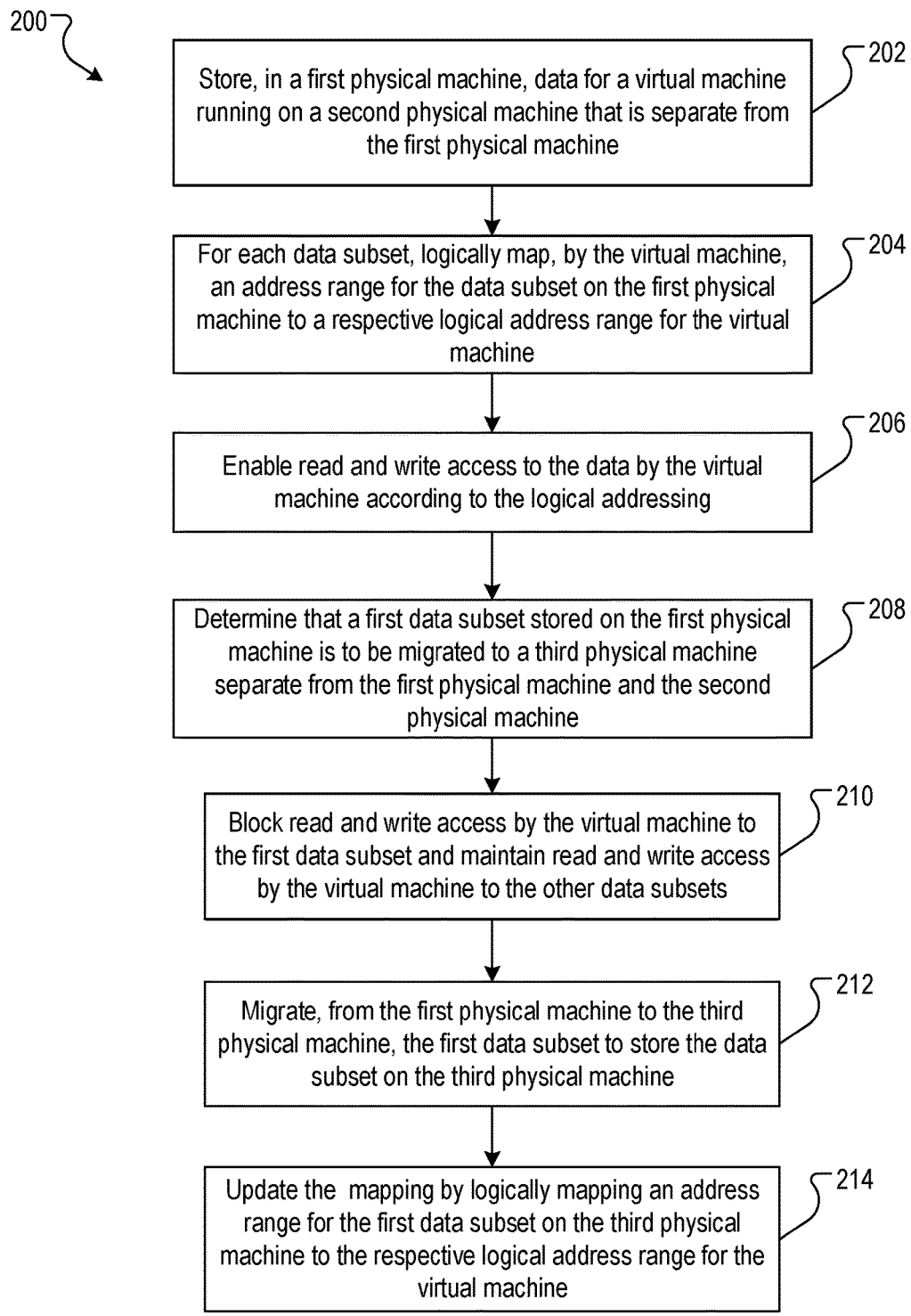
FIG. 2 is a flow chart of an example process for the live migration of data.

FIG. 2 is a flow chart of an example process 200 for the live migration of data. The process 200 may be implemented in the physical machines 110, 140 and 150 of FIG. 1.

The process 200 stores, in a first physical machine, data for a virtual machine running on a second physical machine that is separate from the first physical machine (202). For example, as shown in FIG. 1, the data 142 is stored according to data subsets that are each exclusive of each other. A "data subset" of the data 142 can be either a predefined data construct, such as a block, sector or page, or may be an arbitrarily defined unit of data, such as a 1 KB, 1 MB, 10 MB, or even 1 GB amount of data. In the case of the former, the block or page may be of the size as virtually realized for the virtual machine, or, alternatively, may be of a physical size as determined by the physical hardware used.

The process 200, for each data subset, logically maps, by the virtual machine, an address range for the data subset on the first physical machine to a respective logical address range for the virtual machine (204). For example, the virtual machine (or, alternatively, the host machine) logically maps the address at which the data appears to reside from the perspective of the virtual machine to the physical address at which the data actually resides. Any appropriate address translation process that can map a logical address in a data processing process on a first machine to a physical address on a second machine separate from the first machine can be used.

In the case of the latter implementation, in which the data subset is of an arbitrary size, several factors may be considered by an administrator when determining the size. The smaller the size of the data subset, the more mapping data 128 will be required. However, because the amount of time the data subset is in-flight during migration decreases as the size of the data subset decreases, smaller data subsets tend to result in fewer read and write delays that may occur when the virtual machine 120 attempts to access the data subset undergoing a migration.

In some implementations, the virtual machine 120, or host machine 110, may compare the rate of data access blocks due to migrations to a maximum block rate threshold. If the rate exceeds a maximum block rate threshold, then a memory management process is invoked by the virtual machine (or, alternatively by the storage machines storing the data) to reduce the data subset size. Thereafter, a new rate of data access blocks is determined. The process may continue until the rate is below the maximum block rate threshold.

In other implementations, the virtual machine 120, or host machine 110, may compare a size metric value derived from the size of the mapping data 128 to a maximum size threshold. If the size metric value exceeds the maximum size threshold, the then memory management process invoked by the virtual machine (or, alternatively by the storage machines storing the data) may increase the data subset size so that the amount of metadata required for the logical to physical mapping is reduced.

In still other implementations, the rate of data access blocks and the size metric value derived from the size of the mapping data 128 may both be used to manage the size of the data subsets. Trade-offs may be determined based on weightings that indicate the relative importance of the two performance considerations.

The process 200 enables read and write access to the data by the virtual machine according to the logical addressing (206). For example, when no data subsets are being migrated, the virtual machine 120 has access to all data subsets of the guest data 142.

The process 200 determines that a first data subset stored on the first physical machine is to be migrated to a third physical machine separate from the first physical machine and the second physical machine (208). For example, some or all of the data stored on the storage machine 140 may need to be migrated. Again, a variety of events may require migration of some of the data or all of the data. In this example, assume that one data subset, indicated by the data subset index 2, shown in phantom in FIG. 1, is to be migrated from the storage machine 140 to the storage machine 150.

The process 200 blocks read and write access by the virtual machine to the first data subset and maintains read and write access by the virtual machine to the other data subsets (210). In some implementations, the blocking may be done by the storage machine 140. The storage machine 140 may send a notification to the virtual machine 120 so that it does not have access to data stored in the data subset undergoing migration, and the virtual machine 120 may then hold any read or write operations until it receives a notification that the migration is complete from either the storage machine 140 or the storage machine 150, as indicated by arrows 3A and 3B, respectively.

Alternative, the storage machine 140 may not notify the virtual machine 120 of the migration, and the virtual machine 120 is only notified when the migration is complete. Should the virtual machine 120 request data from the data subset when the data subset is in flight, it may then be notified of the migration, and/or redirected to the second storage machine 150.

In the example implementations above, the data subset is migrated directly from the storage machine 140 to the storage machine 150, and not through the host machine 110. However, in other implementations, the data subset may be transferred through the host machine 110. For example, in implementations in which the virtual machine 120 handles the migration of the data subsets, the data subsets are transferred to the virtual machine and then sent from the virtual machine 120 to the storage machine 150. This is shown in FIG. 1 by arrows 4A and 4B, which are indicative of the actual data path of the migration indicated by arrow 2.

The virtual machine 120 (or host machine 110) may select the second storage machine 150 from one of multiple different storage machines available. This latter implementation facilitates "stateless" storage machines that store the data subsets without reference to an address of the virtual machine or any other storage machine, and without having to track a state of a migration and identify itself as in a "migration state." Instead, management of data storage is handled by the virtual machine 120.

The process 200 migrates, from the first physical machine to the third physical machine, the first data subset to store the data subset on the third physical machine (212). As described above, the data subset may be sent directly from the storage machine 140 to the storage machine 150, or, alternatively, may be fetched by the virtual machine 120 from the first storage machine 140 and then sent to the second storage machine 150.

The process 200 updates the mapping by logically mapping an address range for the first data subset on the third physical machine to the respective logical address range for the virtual machine (214). The data used to update the mapping depends on the implementation used. For example, in the implementation in which the virtual or host machine controls the migration, the virtual or host machine can update the mapping data based on the address of the storage machine to which the virtual machine sent the data subset. In the implementations in which the storage machines control the migration of the data subset, the virtual or host machine can update the mapping data based on a notification received by the virtual machine that indicates the address of the storage machine to which the data subset was sent.

Live Migration Subject to Storage Machine Control

Figure 3:
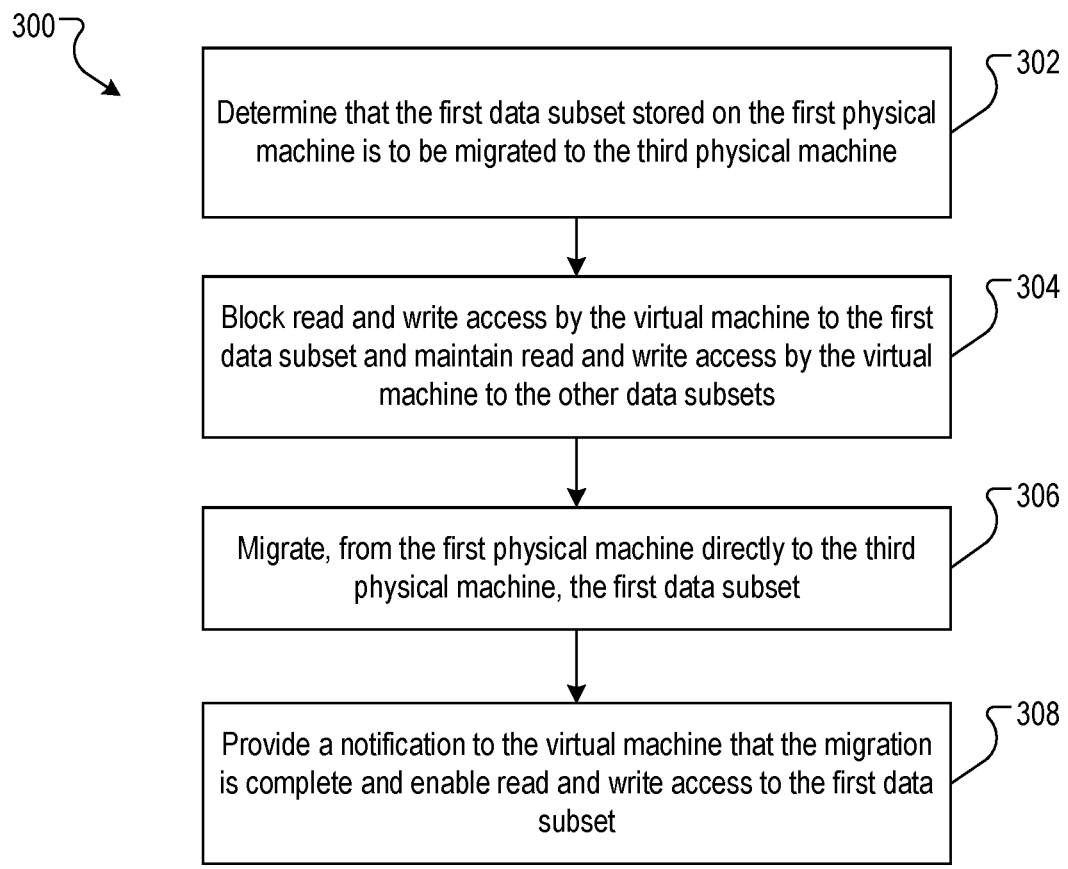
FIG. 3 is a flow chart of an example process for the live migration of data in which data subsets are migrated directly from a first physical machine to a third physical machine.

FIG. 3 is a flow chart of an example process 300 for the live migration of data in which data subsets are migrated directly from a first physical machine to a third physical machine. The process 300 may be implemented in one or both of the storage machines 140 and 150.

The process 300 determines that the first data subset stored on the first physical machine is to be migrated to the third physical machine (302). For example, the storage machine 140 may determine that it is to go offline for maintenance and needs to migrate all the data stored at the storage machine, or that it has reached a storage capacity limit and needs to migrate a portion of the data stored at the storage machine.

The process 300 blocks read and write access by the virtual machine to the first data subset and maintains read and write access by the virtual machine to the other data subsets (304). For example, the storage machine 140 sends a notification to the virtual machine identifying the data subset that is being migrated and instructing the virtual machine to not attempt to write to the data subset or read the data subset until it is notified of the successful migration. This is indicated by the arrow 3A of FIG. 1.

The process 300 migrates, from the first physical machine directly to the third physical machine, the first data subset (306). For example, the storage machine 140 sends the data subset to the second storage machine 150 without involving the host machine 110 as an intermediary.

The process 300 provides a notification to the virtual machine that the migration is complete and enables read and write access to the first data subset (308). For example, the first storage machine 140 may receive an acknowledgement from the second storage machine 150 of the successful receipt of the data subset, and in turn may send a notification of the migration of the data subset and the address of the second storage machine 150 to the virtual machine 120. The virtual machine 120 may then update its mapping data 128 and resume access to the data subset at the new location on the storage machine 150. Alternatively, after the second storage machine 150 successfully receives the data subset, the second storage machine may send the notification of the migration of the data subset and the address of the second storage machine 150 to the virtual machine 120. The virtual machine 120 may then update its mapping data 128 and resume access to the data subset at the new location on the storage machine 150.

Live Migration Subject to Virtual Machine or Host Machine Control

Figure 4:
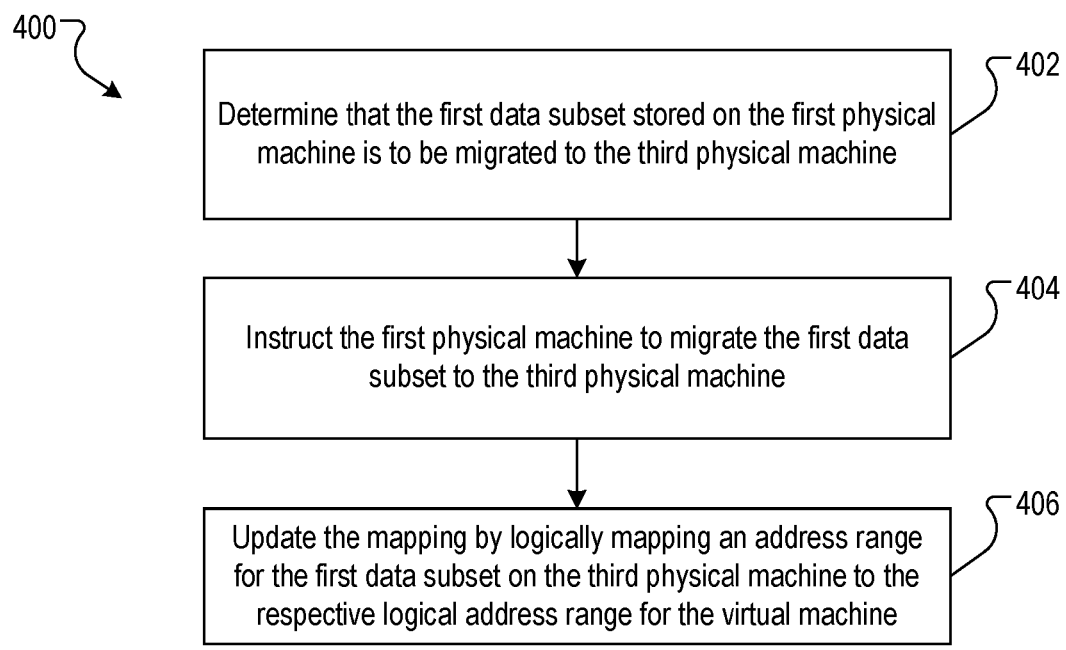
FIG. 4 is a flow chart of an example process for the live migration of data in which data subsets are migrated from a first physical machine to a third physical machine and through the physical machine in which the virtual machine is implemented.

FIG. 4 is a flow chart of an example process 400 for the live migration of data in which data subsets are migrated from a first physical machine to a third physical machine and through the physical machine in which the virtual machine is implemented. The process may be implemented in the virtual machine 120 (or host machine 110).

The process 400 determines that the first data subset stored on the first physical machine is to be migrated to the third physical machine (402). For example, the virtual machine 120 may determine that the storage machine 140 has a high latency; or may determine that a load balancing operation is necessary; or may even receive a notification from the first storage machine 140 that the first storage machine 140 is going offline for maintenance and needs to migrate the data stored for the virtual machine 120.

The process 400 instructs the first physical machine to migrate the first data subset to the third physical machine (404). For example, the virtual machine 120 instructs the storage machine to migrate the data subset to the storage machine 150. The virtual machine 120 will also not access the data subset until the migration is complete.

In some implementations, the virtual machine 120 may receive the data subset from the first storage machine 140 and send the data subset to the storage machine 150, as indicated by arrows 3A and 3B. In other implementations, the virtual machine 120 may instruct the storage machine 140 to send the data subset directly to the storage machine 150.

The process 400 updates the mapping by logically mapping an address range for the first data subset on the third physical machine to the respective logical address range for the virtual machine (406). For example, upon receiving a notification of a successful migration, e.g., from an acknowledgement message from the storage machine 150, the virtual machine 120 updates the mapping data 128 and restores access to the data subset.

Additional Implementation Details

Variations to the example system and processes described above may be implemented to realize additional features. For example, instead of waiting for a notification of successful migration, the virtual machine may calculate an expected time of completion of the migration. After the expected time has passed, the virtual machine may attempt to access the data subset. If unsuccessful, it may wait for another period of time, or may instead invoke a memory error event.

In other implementations, data subsets may be realized at a block or page level, and a "watermark" is used such that all addresses below X are on the first physical machine, and all addresses at or above X are on the third physical machine (or, when data is stored in three or more physical machines, contiguous address ranges may be used for each physical machine). The value of X is updated in the data processing process as data are migrated. This can eliminate the data processing process mapping of logical address to data subset, and instead maps partitions of the physical machines storing data according to the watermark value of X. Accordingly, metadata requirements to realize the mapping data 128 are reduced.

In other implementations, pre-copy and post-copy migration techniques may be used on a per-data subset basis. This implementation reduces or eliminates the waiting period of a virtual machine during migration at the expense of system complexity.

The examples above are described in the context of a cloud-based system or in data centers. However, the systems and methods described herein can be utilized in any system that manages stored data remotely from a computer on which an application or virtual machine that accesses the data is running.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing system, the method comprising:
   storing a mapping for a data processing process that processes data stored in a first physical machine, the data stored according to a plurality of data subsets that are each exclusive of each other;
   for each data subset, logically mapping in the mapping an address range for the data subset on the first physical machine to a respective logical address range for the data processing process;
   enabling read and write access to the data for the data processing process according to the logical addressing;
   in response to a determination that a first data subset stored on the first physical machine is to be migrated to a second physical machine separate from the first physical machine, blocking read and write access for the data processing process to the first data subset while maintaining read and write access for the data processing process to the other data subsets; and
   in response to a migration of the first data subset from the first physical machine to the second physical machine to store the data subset on the second physical machine, updating the mapping by logically mapping an address range for the first data subset on the second physical machine to the respective logical address range for the data processing process.

2. The method of claim 1, wherein the data processing process is executed on a third physical machine separate from the first physical machine and the second physical machine.

3. The method of claim 2, wherein:
   the determination that the first data subset stored on the first physical machine is to be migrated to the second physical machine is performed by the first physical machine; and
   blocking read and write access for the data processing process to the first data subset while maintaining read and write access for the data processing process to the other data subsets comprises blocking, by the first physical machine, read and write access for the data processing process to the first data subset.

4. The method of claim 3, further comprising:
   receiving, from the first physical machine by the data processing process, a notification of the migration of the first data subset to the second physical machine; and
   wherein updating the mapping by logically mapping the address range for the first data subset on the second physical machine to the respective logical address range for the data processing process is done in response to the data processing process receiving the notification provided by the first physical machine.

5. The method of claim 4, wherein the notification instructs the data processing process to not access the first data subset.

6. The method of claim 4, wherein the first data subset is sent from the first physical machine directly to the second physical machine during the migration.

7. The method of claim 3, further comprising:
   receiving, from the second physical machine by the data processing process, a notification of the migration of the first data subset to the second physical machine; and
   wherein updating the mapping by logically mapping the address range for the first data subset on the second physical machine to the respective logical address range for the data processing process is done in response to receiving the notification by the data processing process.

8. The method of claim 2, further comprising determining, by the data processing process, that the first data subset stored on the first physical machine is to be migrated to the second physical machine; and
migrating, from the first physical machine to the second physical machine, the first data subset to store the data subset on the second physical machine comprises:
instructing, by the data processing process, the first physical machine to send the first data subset to the data processing process; and
sending, by the data processing process, the first data subset received from the first physical machine to the second physical machine;
the updating the mapping is done by the data processing process.

9. The method of claim 2, further comprising restoring read and write access to the first data subset for the data processing process after the migration of the first data subset from the first physical machine to the second physical machine.

10. The method of claim 1, wherein the data subsets are data chunks logically mapped to a physical address range.

11. The method of claim 1, the data subsets are data blocks.

12. A system, comprising:
a data processing device; and
a non-transitory computer-readable memory in data communication with the data processing device and storing instructions executable by the data processing device and that upon such execution cause the data processing device to perform operations comprising:
storing a mapping for a data processing process that processes data stored in a first physical machine, the data stored according to a plurality of data subsets that are each exclusive of each other;
for each data subset, logically mapping in the mapping an address range for the data subset on the first physical machine to a respective logical address range for the data processing process;
enabling read and write access to the data by the data processing process according to the logical addressing;
in response to a determination that a first data subset stored on the first physical machine is to be migrated to a second physical machine separate from the first physical machine, blocking read and write access for the data processing process to the first data subset while maintaining read and write access for the data processing process to the other data subsets; and
in response to a migration of the first data subset from the first physical machine to the second physical machine to store the data subset on the second physical machine, updating the mapping by logically mapping an address range for the first data subset on the second physical machine to the respective logical address range for the data processing process.

13. The system of claim 12, wherein the data processing device is a physical machine separate from the first physical machine and the second physical machine.

14. The system of claim 12, wherein the data processing process is executed on the data processing device.

15. The system of claim 12, wherein the data processing process is executed on a third physical machine separate from the data processing device, the first physical machine, and the second physical machine.

16. A non-transitory computer-readable memory in data communication with the data processing device and storing instructions executable by the data processing device and that upon such execution cause the data processing device to perform operations comprising:
storing a mapping for a data processing process that processes data stored in a first physical machine, the data stored according to a plurality of data subsets that are each exclusive of each other;
for each data subset, logically mapping in the mapping an address range for the data subset on the first physical machine to a respective logical address range for the data processing process;
enabling read and write access to the data by the data processing process according to the logical addressing;
in response to a determination that a first data subset stored on the first physical machine is to be migrated to a second physical machine separate from the first physical machine, blocking read and write access for the data processing process to the first data subset while maintaining read and write access for the data processing process to the other data subsets; and
in response to a migration of the first data subset from the first physical machine to the second physical machine to store the data subset on the second physical machine, updating the mapping by logically mapping an address range for the first data subset on the second physical machine to the respective logical address range for the data processing process.

* * * * *